United States Patent [19]

Freese et al.

[11] Patent Number: 4,536,525

[45] Date of Patent: Aug. 20, 1985

[54] AQUEOUS COATING COMPOSITION BASED ON A CATIONIC AMINO UREA RESIN, PROCESS FOR APPLYING AND BAKING THE COMPOSITION AND THE COATED SUBSTRATE THUS OBTAINED

[75] Inventors: Karl-Heinz Freese, Stuttgart; Hans-Jürgen Münch, Sachsenheim, both of Fed. Rep. of Germany

[73] Assignee: Akzo N.V., Arnhem, Netherlands

[21] Appl. No.: 629,574

[22] Filed: Jul. 11, 1984

[30] Foreign Application Priority Data

Jul. 18, 1983 [NL] Netherlands ......................... 8302557

[51] Int. Cl.³ ........................ C08L 63/00; C08L 67/00
[52] U.S. Cl. ..................................... 523/414; 524/538
[58] Field of Search ................. 523/414, 400; 524/538

[56] References Cited

U.S. PATENT DOCUMENTS 4,436,890  3/1984  Kaufman ............................. 523/400
4,442,247  4/1984  Ishikura et al. ..................... 524/538

*Primary Examiner*—Lewis T. Jacobs
*Attorney, Agent, or Firm*—Parkhurst & Oliff

[57] ABSTRACT

The invention provides an aqueous coating composition based on a cationic amino urea resin having an amine number of 3–250 and obtained by reacting an organic isocyanate with a polyamino amide having an amine number of 40–500 and built up from a mono- or dicarboxylic acid and a polyamine, said composition also containing a solid particulate epoxy group-containing compound and/or a solid particulate polyester having a melting point of at least 40° C. The invention also pertains to the process for applying and baking said composition and to the coated substrate thus obtained.

21 Claims, No Drawings

AQUEOUS COATING COMPOSITION BASED ON A CATIONIC AMINO UREA RESIN, PROCESS FOR APPLYING AND BAKING THE COMPOSITION AND THE COATED SUBSTRATE THUS OBTAINED

The invention relates to an aqueous coating composition based on a cationic amino urea resin having an amine number of 3–250 and obtained by reacting (A) an organic isocyanate having 1–4 isocyanate groups and 2–48 carbon atoms with (B) a polyamino amide having an amine number of 40–500 built up from (1) a mono- and/or dicarboxylic acid having 2–40 carbon atoms and (2) a polyamine having 2–8 primary and/or secondary amino groups and 2–20 carbon atoms, and neutralization of at least part of the amino groups. Such a coating composition is subject of the non prepublished German Patent Application No. 33 25 814.7 filed in the name of Akzo GmbH (inventors: Dipl.-Chem.Dr. H. Kersten and Dipl.-Chem. H. Mägerlein).

U.S. patent specification No. 4,169,080 discloses an aqueous coating composition that contains as continuous phase water having dispersed therein an ionized adduct of (1) a polyamide with terminal primary amino groups and (2) a polyisocyanate, the remaining isocyanate groups being blocked by a volatile blocking agent. The aqueous composition contains as discontinuous phase liquid droplets of a hydroxy functional organic material, said material being a polyester or a polyether provided by an epoxy resin derivative in which all epoxy groups have been consumed by reaction with an acid, a phenol or an alcohol. It should be noted that the liquidity of the discontinuous phase is provided by the liquidity of the OH-functional organic material or by dissolving a material in an organic solvent which is miscible with water to a limited extent.

The coating composition according to the invention is characterized in that the composition also contains 5–1000 parts by weight (calculated on 100 parts by weight of the cationic binder as solid matter) of a solid epoxy group-containing compound having a number average molecular weight of at least 900 and an epoxy equivalent weight in the range of from 450 to 7500 and/or a solid polyester compound, the solid compound having a melting point of at least 40° C. and an average particle size in the range of from 0,5 to 35 μm.

It is an object of the present invention to provide an aqueous coating composition which when in the cured state displays improved mechanical properties and improved corrosion resistance.

Examples of suitable organic isocyanates from which the binder may be built up include aliphatic, cycloaliphatic or aromatic mono-, di-, tri- or tetraisocyanates, which may be ethylenically unsaturated or not, such as methyl, ethyl, vinyl, propenyl, butyl, hexyl, octyl, dodecyl, hexadecyl or octadecyl isocyanate, 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, ω,ω'-dipropylether diisocyanate, 1,3-cyclopentane diisocyanate, 1,2-cyclohexane diisocyanate, 1,4-cyclohexane diisocyanate, isophoron diisocyanate, 4-methyl-1,3-diisocyanatocyclohexane, trans-vinylidene diisocyanate, dicyclohexyl methane-4,4'-diisocyanate, 3,3'-dimethyl-dicyclohexyl methane-4,4'-diisocyanate, a toluene diisocyanate, 1,3-bis-(isocyanatomethyl)benzene, a xylylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenyl methane, 3,3'-dimethyl-4,4'-diisocyanatodiphenyl methane, a diisocyanatonaphthalene, the adduct of 3 molecules of hexamethylene diisocyanate and 1 molecule of water (available under the trade mark Desmodur N of Bayer), the adduct of 1 molecule of trimethylol propane and 3 molecules of toluene diisocyanate (available under the trade mark Desmodur L of Bayer) and the adduct of 1 molecule of trimethylol propane and 3 molecules of isophoron diisocyanate, and compounds such as 1,3,5-triisocyanatobenzene and 2,4,6-triisocyanatotoluene and the adduct of 1 molecule of pentaerythritol and 4 molecules of toluene diisocyanate.

It is preferred that use should be made of isocyanates having 2–24 carbon atoms, more particularly aromatic diisocyanates having 8–18 carbon atoms, such as 2,4- or 2,6-diisocyanatotoluene, the dimer thereof or 4,4'-diisocyanatodiphenyl methane, or (cyclo)aliphatic diisocyanates having 8–14 carbon atoms, such as hexamethylene diisocyanate and isophoron diisocyanate.

The polyamino amide from which the binder is partly built up is obtained according to the invention by reacting a mono- and/or dicarboxylic acid having 2–40 carbon atoms and a particular polyamine. Examples of suitable monocarboxylic acids, which preferably contain 1–24 carbon atoms, include saturated aliphatic monocarboxylic acids, such as acetic acid, propionic acid, valeric acid, capronic acid, trimethyl acetic acid, caprylic acid, pelargonic acid, isooctanoic acid, lauric acid, myristic acid, palmitic acid, stearic acid, behenic acid or cerotic acid; aliphatic monocarboxylic acids having one or more conjugated or non-conjugated double C—C bonds, such as acrylic acid, methacrylic acid, linseed oil fatty acid, safflower oil fatty acid, soy-bean oil fatty acid, tall oil fatty acid, wood oil fatty acid, sunflower oil fatty acid, castor oil fatty acid, oiticica oil fatty acid, dehydrated castor oil fatty acid, linoleic acid, linolenic acid, oleic acid, sorbic acid, elaidic acid, α-eleostearic acid, β-eleostearic acid, ricinolic acid, erucic acid, brassidic acid, parinaric acid, isanic acid or isanolic acid; cycloaliphatic monocarboxylic acids such as cyclopentane monocarboxylic acid, cyclopentane propionic acid and cyclohexane monocarboxylic acid, and aromatic monocarboxylic acids such as benzoic acid and p.tert. butyl benzoic acid.

As examples of suitable dicarboxylic acids, which preferably contain 8–36 carbon atoms, may be mentioned aliphatic dicarboxylic acids such as oxalic acid, malonic acid, succinic acid, glutaric acid, adipic acid, azelaic acid, 2,2,4-trimethyl adipic acid, sebacic acid or dimeric fatty acids generally containing 36 carbon atoms, fumaric acid, maleic acid or glutamic acid; cycloaliphatic dicarboxylic acids such as hexahydrophthalic acid, hexahydroterephthalic acid, tetrahydrophthalic acid, endomethylene tetrahydrophthalic acid or methylcyclohexane-1,2-dicarboxylic acid; and aromatic dicarboxylic acids such as orthophthalic acid, isophthalic acid or terephthalic acid. Also suitable are, of course, mixtures of the above-envisaged mono- and-/or divalent carboxylic acids.

In addition to the above-mentioned carboxylic acids other carboxylic acids may be used, such as trimellitic acid, trimerised fatty acids, aconitic acid or citric acid, which acids may be employed in a relatively small amount of not higher than, for instance 30% by weight, preferably less than 10% by weight, calculated on the total amount of carboxylic acid.

The carboxylic acids may, if desired, contain inert substituents, for instance: halogen, nitro, aceto, alkyl ether or alkylthio groups. If desired, instead of the above-envisaged acids use may be made of the anhydrides or acid halides derived therefrom or of esters derived therefrom and from an alcohol having, for instance, 1 to 6 carbon atoms.

If it is desirable to employ an ethylenically unsaturated polyamino amide, then it is preferred that use should be made of an aliphatic monocarboxylic acid having 18 carbon atoms and 1-3 double C—C bonds, such as oleic acid, a dehydrated castor oil fatty acid which substantially consists of 9,11-octadecadienoic acid, and 9,12-octadecadienoic acid, a linseed oil fatty acid which substantially consists of linolenic acid and linoleic acid, a wood oil fatty acid or a tall oil fatty acid and/or a dimer of such a di- or triunsaturated fatty acid.

Polyamines from which according to the invention the polyamino amide is partly built up are preferably polyamines having 1 or 2 primary and 1-6 secondary amino groups, such as 3-amino-1-(methylamino)propane, 3-amino-1-(cyclohexylamino)propane, N-(2-hydroxyethyl)ethylene diamine, more particularly polyamines of the formula $H_2N—(R_2—NH)_n—R_1—NH_2$, wherein the group $R_1$ and the n groups $R_2$ may be the same or different and represent an alkylene group having 2-6 carbon atoms and preferably 2-4 carbon atoms and n is a number from 1-6, preferably 1-3. By an alkylene group is also to be understood here a cycloalkylene group or an alkylene group having an ether-oxygen atom.

Representative polyalkylene polyamines include diethylene triamine, dipropylene triamine, dibutylene triamine, dihexylene triamine, triethylene tetramine, tetraethylene pentamine, tetrapropylene pentamine, pentaethylene hexamine or polyamino compounds having different alkylene groups in a molecule, for instance:

$H_2N(CH_2)_2NH(CH_2)_3NH_2$,
$H_2N(CH_2)_3NH(CH_2)_2NH(CH_2)_3NH_2$ and $H_2N(CH_2)_3NH(CH_2)_2NH(CH_2)_2NH(CH_2)_3NH$, or mixtures of the above-envisaged compounds. The two last-mentioned compounds may be prepared for instance by addition of ethylene diamine or diethylene triamine to acrylonitrile, followed by hydrogenation of the product thus prepared.

Preferred polyamines from which according to the invention the polyamino amide are also partly built up are aliphatic, cycloaliphatic or aromatic amines having 2 or 3 exclusively primary amino groups. Examples of such polyamines include ethylene diamine, propylene diamine, butylene diamine, pentamethylene diamine, hexamethylene diamine, decamethylene diamine, 4,7-dioxadecane-1,10-diamine, dodecamethylene diamine, 4,9-dioxadodecane-1,12-diamine, 7-methyl-4,10-dioxa-tridecane-1,13-diamine, 1,2-diamino cyclohexane, 1,4-diamino cyclohexane, 4,4'-diamino dicyclohexyl methane, bis(3-methyl-4-amino cyclohexyl)methane, 2,2-bis-(4-amino cyclohexyl)propane, (3-methyl-4-amino cyclohexyl)-(3-methyl-4-amino phenyl)methane, 4,4'-diaminodiphenyl methane, diaminodiphenyl sulphone, bis(3-methyl-4-aminophenyl)methane and bis-(3-amino propyl)methylamine.

The polyamino amide may be prepared in any well-known or convenient manner from the mono- and/or dicarboxylic acid and one or more polyamines, for instance by reacting the reaction components with each other at a temperature generally of 100°-220° C., preferably 115°-190° C. Usually, no solvent is applied, but it is self-evident that one or more solvents, for instance methanol, may optionally be employed.

In the reaction mixture the carboxylic acid is usually present in an amount such that 40-100%, preferably 60-99% of the number of free primary amino groups of the polyamine are amidated.

It has also been found that the presence of free primary amino groups in the final cationic binder may give rise to improved dispersion of the binder in water and also leads to better properties of the baked coating. To that end, in the preparation of the polyamino amide not all primary amino groups of a polyamine having primary groups are amidated, but part of them, for instance not more than 40%, are blocked, usually after amidation, in a known manner, with for instance, a ketone, such as methylethyl ketone, methylisobutyl ketone or cyclohexanone. Upon dispersing the final binder in water the blocking agent is split off and the blocked primary amino groups are liberated.

In the preparation of the polyamino amide it is possible, especially at reaction temperature higher than, say, 150° C. that amidine rings are formed by intramolecular splitting off of water from an amino alkylene structural unit and the adjacent amido group. Thus, the use of ethylene polyamine may result in the formation of imidazoline rings and the use of propylene polyamine in the formation of tetrahydropyrimidine rings. Such amidine rings, however, are not necessarily formed nor are they necessary as such. However, if a particular content of such amidine rings is yet required, then the polyamino amide should be heated, optionally in the isolated state, for a few hours, for instance 2-7 hours to a temperature of, say, 190°-250° C. The polyamino amide according to the invention preferably has an amine number of 50-400, more particularly to 75-250. The polyamino amide generally further has 0-12 equivalents, preferably 0-7 equivalents of ethylenically unsaturated double bonds per 1000 molecular weight units.

The reaction between the isocyanate and the polyamino amide may be carried out in any known or convenient manner, for instance in an organic solvent at a temperature generally in the range of 0°-100° C., preferably 15°-70° C., and optionally in the presence of an oxidation inhibitor, such as hydroquinone. Suitable solvents include ketones, such as methylethyl ketone and cyclohexanone; esters, and ethers, for instance glycol ethers. On conclusion of the reaction a compound with active H, for instance an alcohol, may optionally be added to the reaction mixture and, if desired, the solvent still present may be removed from the reaction mixture, generally under reduced pressure.

The ratio of the isocyanate compound to the polyamino amide in the reaction mixture is generally so use may be made, if desired, of mixtures of epoxy resins. It is preferred that the epoxy equivalent weight of the epoxy resin(s) should be 600 to 2000, more particularly 800 to 1500. It is preferred that the epoxy resin should have a number average molecular weight in the range of 1000 to 15000.

The solid, powdered epoxy resin has a melting point which is generally between about 40° C. and the baking temperature, which is in the range of about 80° to 220° C., preferably of about 100° to 160° C. It is preferred that the melting point should be between 70° and 130° C.

In addition to or instead of the solid, powdered epoxy resin the aqueous coating composition may contain a solid polyester compound having a melting point of at least 40° C., provided that the total weight of the solid polyester compound and the solid epoxy resin present is in the range of 5–1000 parts by weight per 100 parts by weight of the cationic binder as solid matter.

The solid, powdered polyester compound has a melting point generally in the range of 40° C. to the baking temperature, which is between about 80° and 220° C., and preferably between about 100° and 160° C. It is preferred that the melting point should be in the range of 70° to 130° C. The acid number of the solid polyester compound is generally lower than about 10, preferably lower than about 6. The hydroxyl number may vary between wide limits, for instance between 0 and 200, preferably between 80 and 130.

The solid polyester compound is generally the reaction product of one or more aliphatic and/or cycloaliphatic mono-, di- and/or polyvalent hydroxy compounds, for instance: ethylene glycol, propylene glycol, neopentyl glycol, benzyl alcohol, glycerol, trimethylol ethane, trimethylol propane, perhydrobisphenol, 1,1'-isopropylidene-bis(p-phenylene-oxy)-di-ethanol-2,1,1'-isopropylidene-bis(p-phenyleneoxy)-dipropanol-2, dicyclohexanol-2,2-propane or pentaerythritol and of one or more aliphatic, cycloaliphatic and/or aromatic mono-, di- and/or polyvalent carboxylic acids, for instance: isononanoic acid, pelargonic acid, so-called fatty acid precondensate, stearic acid, oleic acid, cerotic acid, linolenic acid, benzoic acid, tert.butyl benzoic acid, maleic acid, fumaric acid, phthalic acid, isophthalic acid, terephthalic acid, tetrahydrophthalic acid, trimellitic acid or endomethylene tetrahydrophthalic acid.

The ratio between the hydroxy component and the carboxylic acid component in the polyester compound may generally range between fairly wide limits. A suitable ratio between the carboxylic acid and the hydroxy compound is, for instance, 1 carboxyl equivalent to 1–4 hydroxyl equivalents, preferably 1 carboxyl equivalent to 1,1–1,5 hydroxyl equivalents. Although the use of a monocarboxylic acid in the preparation of the solid polyester compound is optional, use is generally made of a monocarboxylic acid in a ratio of monocarboxylic acid to polycarboxylic acid of 2–10 moles of monocarboxylic acid to 8–12 equivalents of polycarboxylic acid. Also the choice of the hydroxy component of the polyester compound may generally be random, but preferably use is made of a mixture of hydroxy compounds consisting of 1 to 1,5 moles of a divalent hydroxy compound and 4 to 5 moles of a tri- or polyvalent hydroxy compound.

The solid polyester compound is preferably partly built up from a halogen-containing polycarboxylic acid, preferably a cyclic chlorine-, and/or bromine-containing carboxylic acid, such as dichlorophthalic acid, tetrachlorophthalic acid (HET-acid) or the corresponding bromine compounds. The polyester compound is generally built up from such an amount of halogen polycarboxylic acid that the polyester contains 5–35% by weight of chlorine, preferably 12–19% by weight of chlorine or the corresponding amount of a different halogen. Optionally, any present acid groups of the polyester compound may be esterified.

The solid polyester compound may be prepared in any convenient manner, for instance by the melt process, in which the components react with each other with evaporation of the water evolved, or by the solvent process, in which the water is removed azeotropically with, for instance, toluene or xylene.

The average particle size of the solid epoxy resin or solid polyester compound is generally in the range of 0,5 to 35 $\mu$m, preferably 2 to 25 $\mu$m. The solid epoxy resin and/or solid polyester compound may be combined in any suitable manner with the aqueous coating composition according to the invention based on the cationic binder, for instance by adding the solid epoxy resin and/or the solid polyester compound to the amino urea resin or the cationic binder, followed by grinding. Alternatively, however, the solid epoxy resin and/or solid polyester compound as such may for instance be ground to the desired fineness and subsequently be added to the aqueous coating composition or one of the starting components. Use may, of course, also be made of any combination of the above-envisaged methods.

The coating composition may contain usual adjuvants and additives, such as surfactants, anti-sag agents, dispersing agents, antioxidants, soluble corrosion inhibitors, such as lead acetate, dispersion stabilizers, catalysts, levelling agents, sulphur, pigments, fillers, solid, particulate polymers such as powdered polyacrylate or powdered polyamide, siccatives and other curing agents.

Examples of suitable pigments or fillers include iron oxide, lead oxide, lead chromate, lead silicate, strontium chromate, carbon black, titanium dioxide, silica, talc, barium sulphate, and chrome yellow. The weight ratio of pigment and filler to total binder (calculated as solid matter) in the aqueous coating composition is generally in the range of (0,05–4):1, preferably (0,1–2,0):1, depending on the way the coating composition is applied to a substrate. Examples of suitable siccatives include the naphthenates, oleates, acetates and acetyl acetonates of metal compounds, such as those of cobalt, manganese, lead, zinc, vanadium, iron, zirconium, aluminium and calcium. It is preferred that use should be made of an iron (III) compound, for instance: iron acetyl acetonate. Surprisingly, it has been found that compounds such as iron acetyl acetonate have a favourable effect on properties of the composition, such as throwing power, or those of a coating, such as protection from corrosion.

The aqueous coating composition according to the invention may be applied to the substrate in any convenient manner, for instance by spraying, brushing, sprinkling, flow coating, dipping, roller coating, electrostatic spraying or cataphoresis. Cataphoretic deposition usually takes place at a temperature of 10°–40° C. and a voltage of 50–700, preferably 80–600, and an initial current density of 0,1–30 A/100 cm$^2$. The aqueous coating composition according to the invention very well permits applying a first coating by cataphoretic deposition, followed by drying it somewhat for a few minutes, for instance 3–15 minutes, at a temperature of, say, 60°–160° C., and subsequently applying a second coatchosen that the amino urea resin to be prepared has a number of free amino groups corresponding to the amino number desired. Optionally, the amino urea resin may be built up from 2 or more polyamino amides and/or 2 or more isocyanates.

To modify the properties of the amino urea resin to be prepared, for instance enhancing the dispersibility of the binder in water, increasing the second order transition temperature (Tg), controlling the rheology and the molecular weight of the binder or the adapted properties of the final baked coating, such as the hardness, a modifying agent may optionally be added to the reaction mixture consisting of the polyisocyanate and the polyamino amide. Examples of suitable modifying agents include amines which may or may not be ethylenically unsaturated, more particularly primary or secondary monoamines or diamines, such as ethyl amine, diethyl amine, propyl amine, di-n-propyl amine, diisopropyl amine, allyl amine, methallyl amine, diallyl amine, dimethallyl amine, n-butyl amine, sec.butyl amine, di-sec-butyl amine, diisobutyl amine, isoamyl amine, diisoamyl amine, n-hexyl amine, n-octyl amine, 2-ethylhexyl amine, n-decyl amine, cyclohexyl amine, piperidine, piperazine, aniline, methyl aniline, pyrrolidine and α-naphthylamine and all polyamines which also may be used in the preparation of the polyamino amide; and hydroxy compounds which may or may not be ethylenically unsaturated and may optionally be of a (poly)cyclic nature, for instance: allyl alcohol, methallyl alcohol; norborneyl-, (di)cyclopentenyl-, cyclohexenyl- and 2(3)-dihydropyranylmono- and/or dihydroxy compounds; alcohols having a tertiary nitrogen atom, such as methyldiethanol amine, dimethyl ethanol amine, diethyl ethanol amine, dipropyl ethanol amine, dibutyl ethanol amine, n-butyl diethanol amine, 4-(2-hydroxyethyl)morpholine, cyclohexyl diethanol amine and ethyloxyethyl aniline; and diols, for instance polyethylene glycol or polypropylene glycol having a molecular weight not higher than 1000, hexamethylene diol, perhydrobisphenol and 1,4-dimethylol cyclohexane. Suitable for use are, of course, also mixtures of 2 or more of the above-envisaged modifying agents. Of the amino urea resin generally 5–60% by weight, preferably 10–35% by weight consists of the isocyanate, 20–90%, preferably 40–70% by weight of the polyamino amide and 0–60% by weight, preferably 0–30% by weight of the modifying agent.

For the afore-described amino urea resin to be rendered water-soluble or water-dispersible, the blocked or non-blocked amino groups present should at least partly be ionized. Generally, 10–100%, preferably 20–45% of the amino groups are ionized. This is generally done in a known manner by neutralization with the aid of an (in)organic, complexing or non-complexing acid. As examples of suitable acids may be mentioned carbonic acid, boric acid, phosphoric acid, sulphuric acid, sulphurous acid, hydrochloric acid, formic acid, acetic acid, propionic acid, glycolic acid, thioglycolic acid, diglycolic acid, thiodiglycolic acid, dithiodiglycolic acid, lactic acid, thiopropionic acid, tartaric acid, malic acid, citric acid, nitrilotriacetic acid, ethylenediaminodiacetic acid, diethylenetriaminopentacetic acid, or mixtures of 2 or more of the above-envisaged acids.

Neutralization of the binder and the preparation of the aqueous composition may optionally be carried out stepwise and in any convenient or known manner. The pH of the resulting solution or dispersion of the cationic amino urea resin is in the range of 4 to 7, usually at about 5–6. Its solids content is about 5–80, preferably 12–60% by weight. The conductivity is generally 300–1000 μS, preferably 600–900 μS. The basic nitrogen content of the cationic amino urea resin is generally 5–500, preferably 20–300 meq/100 g of amino urea resin as solid matter. The amine number of the amino urea resin is preferably 10–150.

Optionally, the aqueous solution or dispersion of the cationic binder may still contain one or more organic solvents, generally in an amount of 0,1–20% by weight, based on the cationic binder.

Examples of suitable solvents include esters, such as the monoalkyl ether of ethylene glycol acetate, with the alkyl group containing 1–6 carbon atoms; ketones such as acetone, methylethyl ketone, diethyl ketone and methyl isobutyl ketone; diethers of glycols of diglycols, such as the diethyl ether or di-n-butyl ether of ethylene diglycol; hydroxy compounds such as ethanol, isopropyl alcohol, amyl alcohol and propylene glycol; and solvents such as tetrahydrofuran, dioxane and diacetone alcohol.

According to the invention the aqueous coating composition preferably contains 20–400 parts by weight (calculated on 100 parts by weight of the cationic binder as solid matter) of a solid epoxy group-containing compound having a number average molecular weight of at least 900, an epoxy equivalent weight in the range of 450 to 7500 and an average particle size of 0,5 to 35 μm. It is preferred that per 100 parts by weight of the cationic binder (as solid matter) the coating composition should contain 30–99 parts by weight of the solid epoxy group-containing compound.

The solid epoxy group-containing compound generally contains at least 1, but preferably 2 or more epoxy groups per molecule. For brevity, the epoxy group-containing compound is referred to hereinafter as epoxy resin. Examples of suitable, solid epoxy resins include glycidyl groups-containing resins such as polyacrylic resins, polyesters, polyethers or polyurethanes, which all contain one or more glycidyl groups per molecule. It is preferred that as epoxy resin there should be used a compound of the following general formula:

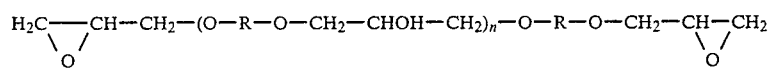

where R represents an aliphatic, cycloaliphatic or aromatic group and n is a number between 0 and 150, preferably between 0 and 60. Examples of such epoxy resins include the glycidyl ethers of, for instance, ethylene glycol, diethylene glycol, triethylene glycol, 1,2-propylene glycol, 1,3-propylene glycol, 1,5-pentane diol, bis-(4-hydroxycyclohexyl)-2,2-propane, 4,4′-dihydroxybenzophenone, bis-(4-hydroxyphenyl)-methane, bis-(4-hydroxyphenyl)-1,1-ethane, bis-(4-hydroxyphenyl)-1,1-isobutane and 1,5-dihydroxynaphthalene. Optionally, use may be made of polyglycidyl ethers of compounds such as glycerol or 1,2,6-hexane triol. Special preference is given to the use of a diglycidyl ether based on bis-(4-hydroxyphenyl)-2,2-propane. Alternatively, ing, for instance by spraying, and finally baking the two coatings simultaneously.

Alternatively, to a coating of the composition of the invention there may be applied a water- or an organic solvent-containing primer and/or a water- or an organic solvent-containing usual top coat based on, for instance, an alkyd resin and a melamine resin, a thermohardening acrylate resin or a 2-component polyurethane system. Instead of being pre-dried, the coat first applied may be normally baked. The thickness of the coat applied by cataphoresis is generally 5-100 μm, preferably 10-50 μm (after drying); applied by other methods it is generally 5-160 μm, preferably 10-70 μm (after drying).

The substrate to be coated is generally of some synthetic material or of some metal or alloy, such as steel, aluminium, zinc, copper, brass, which may optionally be subjected to a usual pretreatment, such as zinc coating, phosphating or zincphosphating. The synthetic material may be electrically conductive or not and may be, for instance, of a polyester, polycarbonate, polyamide or polyphenylene oxide reinforced or not with fibres.

Applying one or more coatings of the coating composition is followed by baking for not longer than 60 minutes, preferably 15-45 minutes, at a temperature of, for instance, 80°-220° C., preferably 100°-160° C. Curing also may be effected by IR-radiation, which takes only a short curing time, e.g. of 5 sec. to 2 min.

The invention will be further described in the following, unlimitative examples.

All parts and percentages are by weight, unless otherwise indicated. The cured coatings obtained in the example were tested for elasticity in accordance with DIN 53156, the values measured being expressed in mm (Erichsen); for impact strength (back of test panel) in accordance with ISO/TR 6272 with the aid of a 1 kg weight, the highest drop height in cm being given at which no cracks are formed yet in the coating; for flexibility in accordance with ASTM D 522-60, the ratings "good", "poor" and "mediocre" standing for no crack formation, crack formation and little crack formation, respectively; for adhesion in accordance with DIN 53151 and for corrosion resistance in a salt spray test in accordance with DIN 50021, use being made of an aqueous 5%-solution of sodium chloride over a period of 120 hours; a value 0 denotes excellent and a value 10 stands for deficient corrosion resistance. The Persoz hardness is measured in accordance with ISO 1522 and is expressed in seconds. The solids content is determined by heating the composition for 1 hour at 105° C. in accordance with ASTM D 1650 and the amine number is measured using perchloric acid.

The polyaminoamide A is a polycondensation resin having an amine number of 210-230 based on diethylene triamine and dimeric fatty acid (available under the trade mark Versamid 115 of Schering). The polyamino amide B is a similar polycondensation resin having an amine number of 83-93 (available under the trade mark Versamid 100 of Schering). The polyamino amides C and D were prepared by polycondensation of 1 mole of diethylene triamine (polyamino amide C) or 1 mole of triethylene tetramine (polyamino amide D) and 2 moles of dehydrated castor oil fatty acid for 90-110 minutes at a temperature of 180° C., with splitting off of the water formed during polycondensation.

The polyester compound A used in the Examples 7 and 8 was prepared by polycondensation of 26,4 parts of trimethylol propane, 9,4 parts of perhydrobisphenol, 30,4 parts of hexachlorendomethylene tetrahydrophthalic acid (HET acid), 3,8 parts of maleic anhydride, 11,6 parts of phthalic anhydride and 12,3 parts of isononanoic acid in a reactor fitted with a stirrer, a thermometer, a water outlet, a condenser and an inlet for an inert gas such as nitrogen or helium. Said compounds were introduced into the reactor, followed by adding 7% by weight of xylene. The reaction mixture was heated to and kept at a reaction temperature of 185°-190° C. with stirring and introducing inert gas, the water formed during polycondensation being removed azeotropically with xylene and the xylene being fed back into the reactor. During polycondensation, which lasted 10-15 hours, the course of the reaction was followed by determination of the acid number. The reaction was continued until an acid number of 2-3 was attained, after which the xylene was removed in vacuo. Finally, the solid polyester compound prepared was ground to a powder having particle size of 10-25 μm.

EXAMPLES 1-4

A solution of 20,7 parts of toluene diisocyanate was mixed with a solution of 9,4 parts of diallyl amine and the mixture was kept at a temperature of 50° C. for 1 hour. The two afore-mentioned compounds had been dissolved in equal parts of methylethyl ketone. Over a period of 15 minutes the resulting solution of the reaction product was subsequently added, with stirring and in an atmosphere of nitrogen at a temperature of 20°-30° C., to a 50% -solution in methylethyl ketone of a mixture of 26,6 parts of polyamino amide A and 43,2 parts of polyamino amide C. The reaction mixture was subsequently kept at a temperature of 20° C. for 15 minutes. The resulting amino urea resin had an amine number of 57.

Subsequently, an aqueous dispersion of the amino urea resin obtained was prepared in cationic form by adding acetic acid and deionized water to the organic solution of the binder in an amount such, with the organic solvent being removed in vacuo, that a 20% aqueous, stable binder dispersion having a pH of 5½ was obtained, with 30% of the amino groups being neutralized.

Next, 100 parts of the aqueous binder dispersion were mixed with, respectively, 6 (Example 1), 12 (Example 2), 16 (Example 3) and 20 (Example 4) parts of a solid diglycidyl ether of bis(4-hydroxy phenyl)2,2-propane having an epoxy equivalent weight of 850-940 and a number average molecular weight of 1800 (available under the trade mark Epikote 1004 of Shell), which has an average particle size of 10-15 μm, and with, respectively, 5,2 (Example 1), 6,4 (Example 2), 7,2 (Example 3) and 8,0 (Example 4) parts of a pigment dispersion consisting of 98% of titanium dioxide (available under the trade mark Titandioxyd No. RN 59 of Kronos) and 2% of carbon black (available under the trade mark Raven 1255 of Columbian Carbon Ind.). The resulting coating compositions were ground to a fineness of 10-15 μm and mixed with deionized water in an amount such that coating compositions were obtained having a solids content of 20%, a pH of 5½, a basic nitrogen content of about 35 meq/100 g, a specific conductivity of about 600 μS/cm and a methylethyl ketone content of 1 vol.%.

The coating composition were subjected to a cataphoresis at a voltage of 100-300, the cathode panels used being zinc phosphated sheet metal (Bonderite 132).

Following 2 minutes' cataphoresis at a temperature of 25° C. the panels, which had been provided with a coating about 35 μm thick, were rinsed with deionized water, dried and baked for 25 minutes at a temperature of 140° C. or at a temperature of 160° C. The properties of the baked coatings are mentioned in Table 1. In all cases the adhesion is excellent.

TABLE 1

| Properties | Examples | | | | | | | |
|---|---|---|---|---|---|---|---|---|
| | 1 | | 2 | | 3 | | 4 | |
| | Curing at a temperature (°C.) of | | | | | | | |
| | 140 | 160 | 140 | 160 | 140 | 160 | 140 | 160 |
| Elasticity | >10 | >10 | 9,9 | >10 | 1,2 | 8,7 | 1,3 | 9,2 |
| Flexibility | good | good | good | good | poor | good | medi-ocre | good |
| Impact strength | 10 | 10 | 5 | 10 | 5 | 5 | 5 | 5 |
| Hardness | 235 | 233 | 227 | 264 | 257 | 238 | 245 | 257 |
| Corrosion resistance | 3 | 3 | 2-3 | 1-2 | 1 | 1 | 1 | 0-1 |

Example 2 was repeated, except that a solid, particulate glycidyl ether of triethylene glycol was used as the epoxy resin. After baking at 140° C. a coating was obtained displaying an elasticity of >10, good flexibility and an impact strength of 5.

Example 4 was repeated, except that a solid, particulate glycidyl ether of bis-(4-hydroxycyclohexyl)-2,2-propane was used as the epoxy resin. After baking at 140° C. a coating was obtained displaying an elasticity of 2,1, good flexibility and an impact strength of >5.

For comparison, Example 1 was repeated, except that no solid epoxy resin and only 4 parts of the pigment mixture were added. The hardness of the coating was found to be 97 (baking temperature: 140° C.) and 117 (baking temperature: 160° C.).

EXAMPLE 5

Example 2 was repeated, except that the amino urea resin was prepared by adding, with stirring, in a nitrogen atmosphere, at a temperature of 30° C. and over a period of 20-30 minutes, 46,0 parts of a 50%-solution in methylethyl ketone of 4,4'-diisocyanato diphenyl methane to a 50%-solution in methylethyl ketone of a mixture of 33,5 parts of polyamino amide B, 33,5 parts of polyamino amide D and 10,0 parts of diallyl amine. The reaction mixture was kept at a temperature of 30° C. for 20 minutes. The resulting amino urea resin had an amine number of 60,5.

The properties of the baked coatings are mentioned in Table 2. In all cases the flexibility and the adhesion were excellent.

TABLE 2

| Properties | Curing at a temperature of | |
|---|---|---|
| | 140° C. | 160° C. |
| Elasticity | 6,3 | 9,5 |
| Impact strength | 20 | 20 |
| Hardness | 288 | 294 |
| Resistance to corrosion | 2-3 | 2-3 |

EXAMPLE 6

Example 2 was repeated, except that 100 parts of the aqueous binder dispersion were mixed with 10 parts of the solid epoxy resin and 24 parts of the pigment mixture.

To the aqueous coating composition there was added 1% of propylene glycol. The resulting aqueous coating composition, which had a viscosity of 40 sec (DIN cup 4 mm at 23° C. and a solids content of 45%, was applied to a panel of zinc phosphated sheet metal (Bonderite 132) in a coating thickness of 35 μm by means of a spray gun instead of by cataphoresis. After the coating had been cured for 25 minutes at a temperature of 140° C., it had an elasticity of 7, an impact strength of 10, a hardness of 250 and adhesion and flexibility were excellent. Sandability of the coatings was also excellent.

Applying the coating composition to the panels of any one of the Examples 1-4, followed by curing, also resulted in excellent adhesion. Adhesion of usual coating compositions to a baked coating of the afore-mentioned aqueous coating composition was also found to be excellent.

EXAMPLE 7

100 parts of the aqueous binder dispersion described in the Examples 1-4 were mixed with 20 parts of the afore-described solid polyester compound A and 32 parts of the pigment mixture described in the Examples 1-4. The resulting aqueous coating composition, which had a solids content of 47%, was applied to a panel of iron phosphated sheet metal (Bonder 1041) in a thickness of 40 μm by means of a knife coater. After the coating had been cured for 20 minutes at a temperature of 180° C., it had an elasticity of 0,7, an impact strength of less than 5, a hardness of 249 and an adhesion of 0-1.

EXAMPLE B

Example 7 was repeated, except that the solid polyester resin was added in an amount of 10 parts and the pigment mixture in an amount of 24 parts. The aqueous coating compositions prepared had a solids content of 44%. The coating obtained had an elasticity of 1,8, an impact strength lower than 5, a hardness of 249 and an adhesion of 1.

We claim:

1. An aqueous coating composition based on a cationic amino urea resin having an amine number of 3-250 and obtained by reacting
    (A) an organic isocyanate having 1-4 isocyanate groups and 2-48 carbon atoms with
    (B) a polyamino amide having an amine number of 40-500 built up from
        1. at least one of a mono- and dicarboxylic acid having 2-40 carbon atoms and
        2. a polyamine having 2-8 amino groups selected from primary and secondary amino groups and 2-20 carbon atoms, and neutralization of at least part of the amino groups, characterized in that the coating composition also contains 5-1000 parts by weight (calculated on 100 parts by weight of the cationic binder as solid matter) of at least one solid compound selected from a solid epoxy group-containing compound having a number average molecular weight of at least 900 and an epoxy equivalent weight in the range of from 450 to 7500 and a solid polyester compound, the solid compound having a melting point of at least 40° C. and an average particle size in the range of from 0,5, to 35 μm.

2. A coating composition according to claim 1, characterized in that the isocyanate compound has 2-24 carbon atoms.

3. A coating composition according to claim 1, characterized in that the isocyanate compound is an aromatic diisocyanate having 8-18 carbon atoms or a (cyclo)aliphatic diisocyanate having 8-14 carbon atoms.

4. A coating composition according to claim 1, characterized in that the polyamino amide is partly built up from at least one of a monocarboxylic acid having 1-24 carbon atoms and a dicarboxylic acid having 8-36 carbon atoms.

5. A coating composition according to claim 1, characterized in that the polyamino amide is partly built up from at least one of an aliphatic monocarboxylic acid having 18 carbon atoms and 1-3 double C—C bonds and a dimer of an aliphatic monocarboxylic acid having 18 carbon atoms and 2-3 double C—C bonds.

6. A coating composition according to claim 1, characterized in that the polyamino amide is partly built up from a polyamine having 1 or 2 primary and 1-6 secondary amino groups.

7. A coating composition according to claim 1, characterized in that the polyamino amide is partly built up from a polyamine of the formula

wherein the group $R_1$ and the n groups $R_2$ may be the same or different and represent an alkylene group having 2-6 carbon atoms and n is a number from 1-6.

8. A coating composition according to claim 1, characterized in that the polyamino amide is partly built up from an amine compound having 2 or 3 exclusively primary amino groups.

9. A coating composition according to claim 1, characterized in that the amino urea resin is obtained by reaction of the organic isocyanate compound, the polyamino amide and a modifying agent.

10. A coating composition according to claim 9, characterized in that the modifying agent is at least one of a primary or secondary mono- or diamine and a hydroxy compound.

11. A coating composition according to claim 9, characterized in that of the amino urea resin 10-85% by weight consists of the isocyanate compound, 20-90% by weight of the polyamino amide and 0-60% by weight of the modifying agent.

12. A coating composition according to claim 1, characterized in that the amino urea resin has an amine number of 10-150.

13. A coating composition according to claim 1, characterized in that the polyamino amide has an amine number of 50-400.

14. A coating composition according to claim 1, characterized in that the coating composition contains 20-400 parts by weight (calculated on 100 parts by weight of the cationic binder as solid matter) of the solid epoxy-group containing compound.

15. A coating composition according to claim 14, characterized in that the coating composition contains 30-99 parts by weight (calculated on 100 parts by weight of the cationic binder as solid matter) of the solid epoxy-group containing compound.

16. A coating composition according to claim 1, characterized in that the epoxy group-containing compound is an epoxy resin of the formula

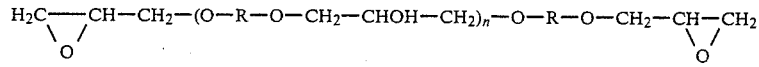

wherein R is an aliphatic, cycloaliphatic or aromatic group and n is a number between 0 and 150.

17. A coating composition according to claim 1, characterized in that the solid epoxy-containing compound has a number average molecular weight in the range of from 1000 to 15000.

18. A coating composition according to claim 1, characterized in that the solid polyester compound has a melting point in the range of from 70° to 130° C.

19. A coating composition according to claim 1, characterized in that the acid number of the solid polyester compound is below about 10.

20. A coating composition according to claim 1, characterized in that the solid polyester compound is built up from a halogen-containing polycarboxylic acid.

21. A coating composition according to claim 20, characterized in that the solid polyester compound contains 5-35% by weight of chlorine or the corresponding amount of a different halogen.

* * * * *